United States Patent
Barber et al.

(10) Patent No.: US 11,250,001 B2
(45) Date of Patent: Feb. 15, 2022

(54) ACCURATE PARTITION SIZING FOR MEMORY EFFICIENT REDUCTION OPERATIONS

(71) Applicant: International Business Machines Corporation, Armonk, NY (US)

(72) Inventors: Ronald J. Barber, San Jose, CA (US); Vincent Kulandaisamy, Hillsboro, OR (US); Sam S. Lightstone, Toronto (CA); Guy M. Lohman, San Jose, CA (US); Ippokratis Pandis, Palo Alto, CA (US); Vijayshankar Raman, Sunnyvale, CA (US); Gregory R. Stager, Markham (CA); Wayne J. Young, Markham (CA); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 14/449,337

(22) Filed: Aug. 1, 2014

(65) Prior Publication Data
US 2016/0034527 A1 Feb. 4, 2016

(51) Int. Cl.
*G06F 16/2455* (2019.01)
(52) U.S. Cl.
CPC .............................. *G06F 16/24554* (2019.01)
(58) Field of Classification Search
None
See application file for complete search history.

(56) References Cited

U.S. PATENT DOCUMENTS

| | | | |
|---|---|---|---|
| 5,860,144 A * | 1/1999 | Frank | G06F 12/109 |
| | | | 711/206 |
| 6,182,061 B1 | 1/2001 | Matsuzawa et al. | |
| 6,453,383 B1 * | 9/2002 | Stoddard | G06F 3/0607 |
| | | | 707/999.202 |
| 7,469,241 B2 | 12/2008 | Bellamkonda et al. | |
| 8,108,401 B2 | 1/2012 | Qiao et al. | |
| (Continued) | | | |

OTHER PUBLICATIONS

Andreas Merkel; Resource-conscious Scheduling for Energy Efficiency on Multicore Processors; 2010; EuroSys; pp. 153-166 (Year: 2010).*

(Continued)

*Primary Examiner* — Amresh Singh
*Assistant Examiner* — Jermaine A Mincey
(74) *Attorney, Agent, or Firm* — Lieberman & Brandsdorfer, LLC

(57) ABSTRACT

Embodiments of the invention relate to processing data records, and for a multi-phase partitioned data reduction. The first phase relates to processing data records and partitioning the records into a first partition of records having a common characteristic and a second partition of records that are not members of the first partition. The data records in each partition are subject to intra-partition data reduction responsive to a resource constraint. The data records in each partition are also subject to an inter-partition data reduction, also referred to as an aggregation to reduce a footprint for storing the records. Partitions and/or individual records are logically aggregated and a data reduction operation for the logical aggregation of records takes place in response to available resources.

15 Claims, 6 Drawing Sheets

(56) References Cited

U.S. PATENT DOCUMENTS

| | | | | |
|---|---|---|---|---|
| 9,047,246 | B1* | 6/2015 | Rahut | G06F 11/1425 |
| 9,489,443 | B1* | 11/2016 | Muniswamy-Reddy | G06F 17/30575 |
| 2008/0288563 | A1* | 11/2008 | Hinshaw | G06F 17/30575 |
| 2009/0094186 | A1* | 4/2009 | Kan | G06F 17/30321 |
| 2011/0302583 | A1* | 12/2011 | Abadi | G06F 16/2471 |
| | | | | 718/102 |
| 2012/0254126 | A1* | 10/2012 | Mitra | G06F 17/30088 |
| | | | | 707/687 |
| 2012/0271845 | A1* | 10/2012 | Netz | G06F 17/30454 |
| | | | | 707/769 |
| 2013/0013585 | A1 | 1/2013 | Graefe | |
| 2013/0226873 | A1* | 8/2013 | Ogata | G06F 11/1453 |
| | | | | 707/640 |
| 2014/0052726 | A1 | 2/2014 | Amberg et al. | |

OTHER PUBLICATIONS

Yu et al., "Distributed Aggregation for Data-Parallel Computing: Interfaces and Implementations," Proceedings of the ACM SIGOPS 22nd Symposium on Operating Systems Principles, pp. 247-260, ACM, 2009.

Larson, "Data Reduction by Partial Preaggression," Proceedings of the 18th International Conference on Data Engineering (ICDE'02), pp. 706-715, 2002.

Larson, "Grouping and Duplicate Elimination: Benefits of Early Aggregation," Microsoft Corporation, Dec. 20, 1997, pp. 1-26.

Yan et al., "Data Reduction Through Early Grouping," Proceedings of the 1994 CAS Conference, Nov. 1994, pp. 227-235.

* cited by examiner

ACCURATE PARTITION SIZING FOR MEMORY EFFICIENT REDUCTION OPERATIONS

BACKGROUND

The present invention relates to processing and partitioning a set of records based on one or more common characteristics among the records. More specifically, the invention relates to performing partitioned data reduction responsive to resource availability.

Data reduction is a common operation in query processing. In relational database management and processing, data reduction is referred to as grouping and aggregation. A query processor accepts a stream of tuples that contain grouping keys and measures, and computes aggregates on all the measures matching each grouping key. In the cloud computing environment, the data reduction is referred to as MapReduce.

A commonly employed tool in data reduction is hashing. Each grouping key is placed in a hash table according to its corresponding hash value, and the hash table resides either in memory or on-chip cache. Virtually all forms of hash table implementation have a fill factor corresponding to a threshold value of the hash table. If the occupation ratio of the hash table exceeds the fill factor and there is available memory, then the hash table has to be resized to a larger form. All keys in the old hash table need to be rehashed and inserted into the new resized table. Resizing a hash table is an expensive operation in both transferring of the keys as well as synchronization across participation threads. A small hash table has an expense associated with resizing. At the same time, a large hash table will occupy memory that could have been used by the query processor for other operations. Accordingly, there are challenges associated with accurately estimating the size of a hash table.

SUMMARY

The invention includes a method, computer program product, and system for processing a set of records, including forming a plurality of partitions for the records, with each partition based upon records having a common characteristic.

A method, computer program product, and system are provided for processing records. As the records are processed, output records are created and organized into at least two groups. A first group is for records that share a common characteristic, and a second group is for records that are excluded from the first group. As the records in the second group increases, an intra-group data reduction process takes place and a reduced set of records in the second group is created. In one embodiment, the intra-group data reduction takes place in response to a constraint on one or more resources. Following intra-group reduction, an inter-group data reduction takes place. In one embodiment, the inter-group reduction is in response to a restriction on resource availability. Groups of records are aggregated based upon a resource budget. In addition, the aggregation is subject to estimated resources for individually processing the groups selected for aggregation. One or more records excluded from the original aggregation may be selectively added into the logical aggregation. Once the aggregation is complete and resources for the reduction are determined to be available, a data reduction operation is performed for the logical aggregation of records.

These and other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

The invention and its advantages and benefits are further explained in the detailed description of the invention herein below.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
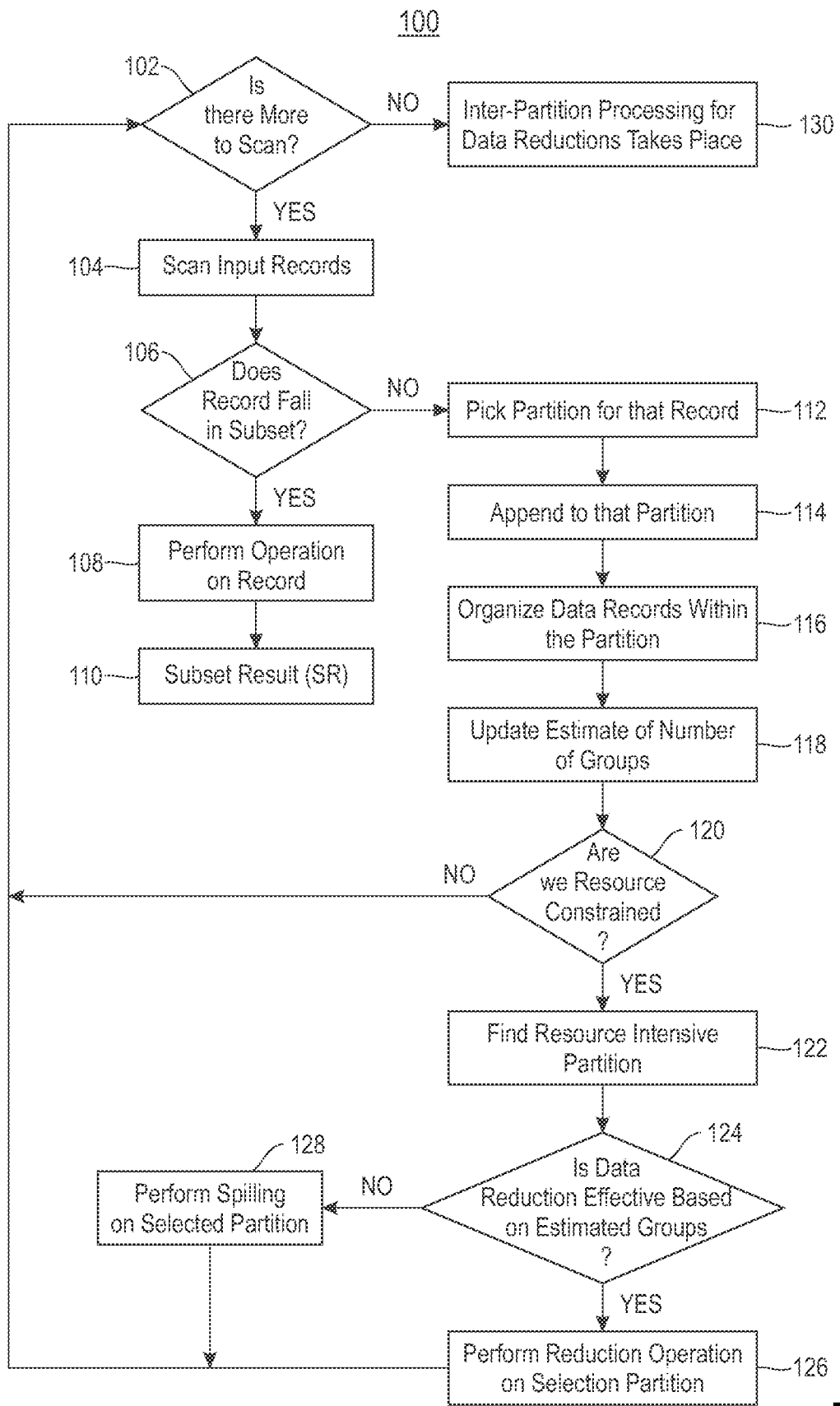
FIG. 1 depicts a flow chart illustrating a process for processing input records and formation of partitions.

Partitioned data reduction is performed in two phases, including intra-partition data reduction and inter-partition data reduction. In a first phase, partitions are formed and data records are placed into a partition based on shared or common characteristics and space availability. Otherwise, the data record is placed in a partition for subsequent processing. With reference to FIG. 1, a flow chart (100) is provided illustrating a process for processing input records and formation of partitions. Initially, it is determined if there are any additional records to be scanned (102). In the event the end of the record scanning has not been reached, an input record is scanned (104), and it is determined if the record falls within an existing subset (106). In one embodiment, an existing subset may be a hash table and the assessment ascertains if the record fits within the parameters of the hash table. There are two aspects pertaining to the hash table, including whether the record belongs in the existing hash table and is there space in the table for the record. A positive response to the determination at step (106) includes an immediate processing of the record (108) and transferring the processed record to the existing subset (110). Accordingly, the first part of the record assessment includes processing the record and assigning the processed record to a designated subset.

If at step (106) it is determined that the matching subset cannot receive the record, i.e. the ascertained table is full or there is no matching table, then a partition is selected for the processed record (112) and the record is appended to the partition (114). In one embodiment, the partition is referred to as a global partition. As records are placed into the partition, the size of the partition expands. In one embodiment, to manage growth of the partition, data records in the partition are organized into groupings based on one or more common characteristics (116). Following step (116), an estimated number of groupings within the partition are updated (118). In addition, it is determined if the partitioning process is resource constrained (120). A negative response to the determination at step (120) is followed by a return to step (102) to process any additional records. However, a positive response to the determination at step (120) is followed by determining a partition that is a significant contributor to the resource constraint (122). The estimated groups resulting from that partition is consulted to determine the effectiveness of reduction processing (124). In one embodiment, the effectiveness of the reduction is based on an estimated size or quantity of groupings. If the reduction is determined to be effective, data reduction for that partition is performed (126), as shown and described in FIG. 2, otherwise spilling for the selected partition is performed (128), as shown and described in FIG. 4. In one embodiment, the data reduction of records within the partition is referred to as intra-partition data reduction. Once the intra-partition processing of the records is completed, the process returns to step (102) to assess for additional records to be processed. Following a determination that there are no more records to be processed, as demonstrated by a negative response to the determination at step (102), inter-partition processing for data reductions takes place (130), as shown and described in FIG. 3. Accordingly, input records are processed and placed in a partition based upon commonality of characteristics.

Figure 2:
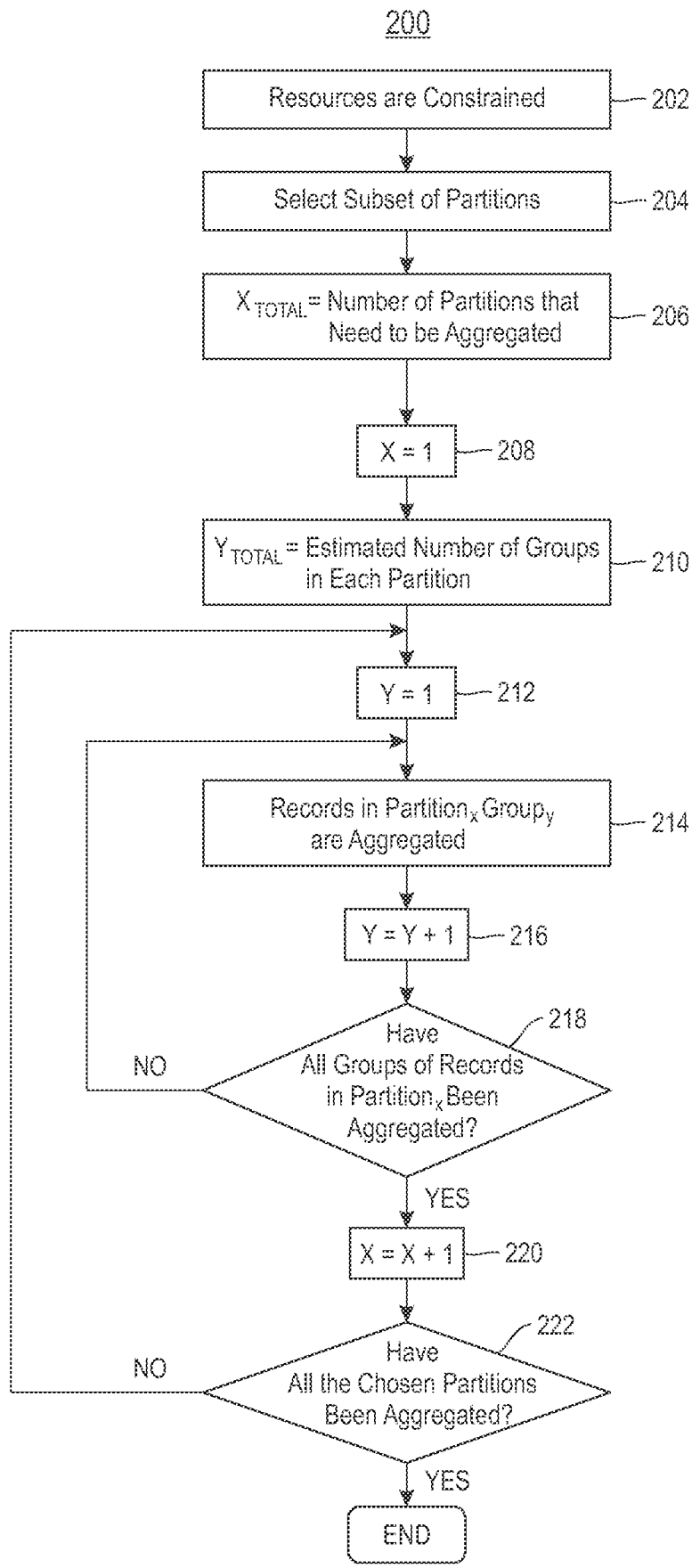
FIG. 2 depicts a flow chart illustrating a process for subjecting the created partitions to aggregation.

As the records continue to be scanned and prior to processing the partitions for data reduction, the partitions may be subject to an aggregation procedure, as shown and described in FIG. 2. Specifically, FIG. 2 is a flow chart (200) illustrating a process for subjecting the created partitions to aggregation. In one embodiment, the aggregation shown and described herein reduces the footprint for storing the partition in memory. As shown, it is determined that resources are constrained (202). A subset of partitions that need to be aggregated to alleviate the resource constraint is selected (204). In one embodiment, the constraint pertains to limited memory availability for one or more partitions, and the alleviation of the constraint reduces memory usage. Records in one or more of the partitions are chosen and aggregated into distinct groups based upon common characteristics. The variable $X_{Total}$ is assigned to the quantity of partitions that need to be aggregated (206) and the partition counting variable X is initialized (208). In addition, the variable $Y_{Total}$ is assigned to the estimated quantity of groups in each partition (210), and the group counting variable Y is initialized (212). The records in the partition$_X$ group$_Y$ are aggregated to reduce the footprint in each of the partitions (214). Following the aggregation at step (214), the group counting variable, Y, is incremented (216), and it is determined if all of the groups of records in partition$_X$ have been aggregated (218). A negative response returns to step (214), and a positive response is followed by an increment of the partition counting variable X (220). It is then determined if all of the chosen partitions have been aggregated (222). A negative response to the determination at step (222) is followed by a return to step (212), and a positive response concludes the aggregation process. Accordingly, as shown herein data reduction may occur on an intra-partition basis.

Figure 3:
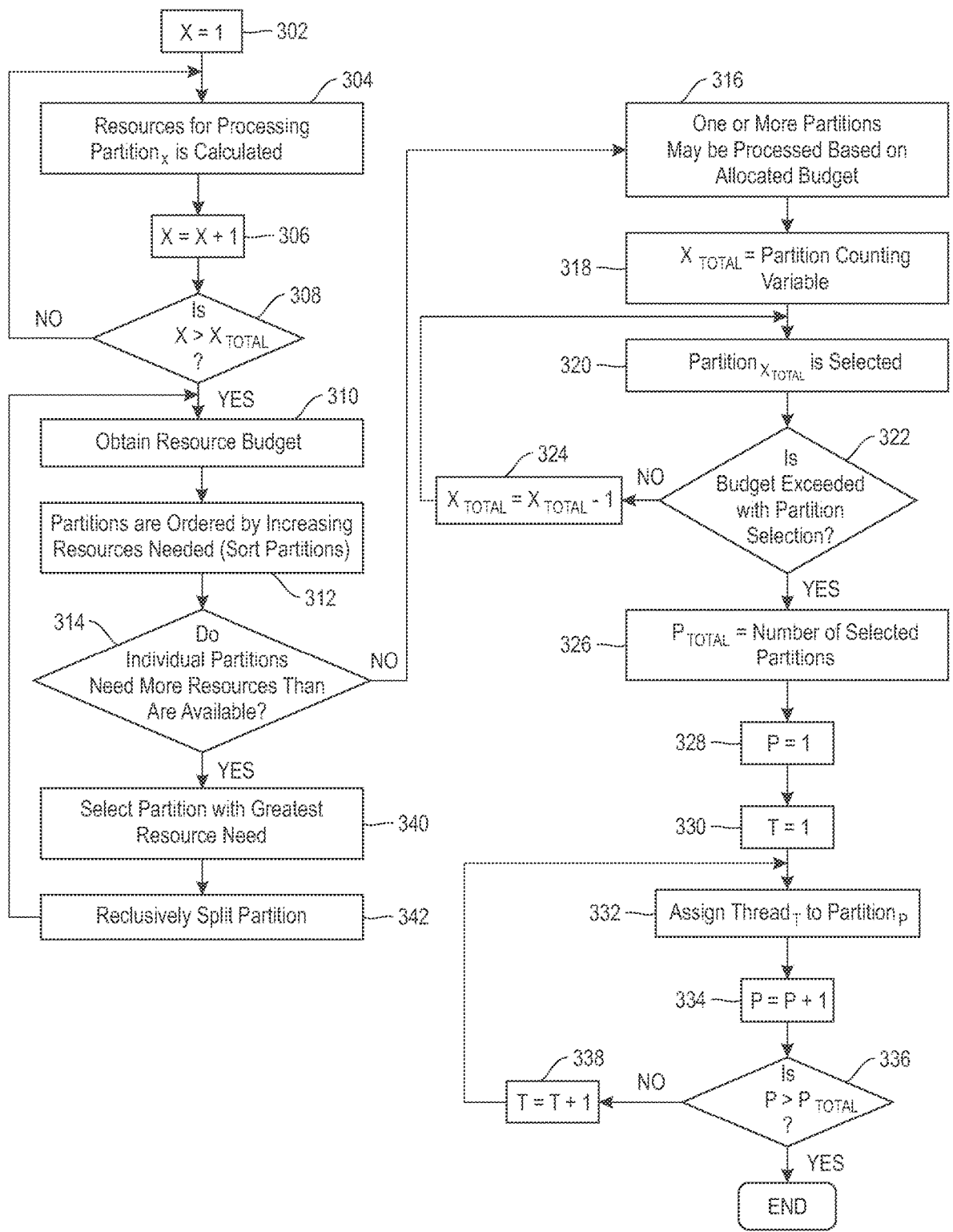
FIG. 3 depicts a flow chart illustrating a process for data reduction on each of the partitions following receipt of all of the records.

Referring to FIG. 3, a flow chart (300) is provided illustrating a process for data reduction on each of the partitions following receipt of all of the records, also referred to herein as inter-partition data reduction. The number of partitions X is initialized (302) and the resources needed for processing partition$_X$ is calculated (304). In one embodiment, the calculation at step (304) is based on an estimated number of groups Y in partition X. Following step (304), the partition counting variable is incremented (306), followed by assessing if an estimate has been calculated for each partition (308). If all of the assessments have not been completed, then the process returns to step (304). Following completion of the initial assessments, a resource budget is obtained (310). The resource budget includes an evaluation of how many resources are available for use by this overall process, and excluding resources already used for an existing subset, and in one embodiment also excludes resources already used or designated for a process state. In one embodiment, the partitions are placed in an order by increasing resource need (312). Based on the partition sorting, it is determined if each of the individual partitions requires more resources than are available based on the resource budget (314). A negative response indicates that one or more partitions may be processed based on the allocated budget (316). A subset of partitions is selected such that an aggregate of their combined resource requirement fits within the available resource budget. In one embodiment, the selection of partitions continues until the resource budget is exceeded. As shown, the partition counting variable is set to $X_{Total}$ (318), and partition$_{XTotal}$ is selected (320) from the list. It is then determined if the resource budget is exceeded with this partition selection (322). A negative response to the determination at step (322) is followed by a decrease of the partition counting variable (324), followed by a return to step (320), and a positive response concludes the partition selection process. Accordingly, a subset of partitions ranging from one to more than one may be selected such that their combined resource requirement fits in the current resource budget.

In one embodiment, data reduction takes place in parallel with multiple threads. Once the partition selection process is completed, one or more threads are assigned to process each partition in the subset. In one embodiment, threads running on the same processor socket are assigned to the same partition. As shown herein, $P_{Total}$ is assigned to the quantity of selected partitions (326), and a partition counting variable, P, is initialized (328). Similarly, a thread counting variable, T, is initialized (330). Thread$_T$ is assigned to partition (332), and the partition counting variable is incremented (334). In the illustration shown herein, one thread is assigned to each partition. However, in one embodiment, the machines may be configured with more processing cores than the number of partition, with multiple threads assigned to one or more partitions. In a preferred embodiment, threads from the same processor socket are assigned to the same partition. Following step (334), it is then determined if there are any partitions remaining to be processed (336). A positive response to the determination at step (336) is followed by an increment of the thread counting variable (338) and a return to step (332), and a negative response to the determination at step (336) concludes the processing of the partitions. Accordingly, based on resource budgets, one or more partitions are processed for data reduction through multithreaded processing.

As shown at step (314), it may be determined that processing any one of the individual partitions may exceed the budgeted resource capacity. A positive response to the determination at step (314) is followed by selection of the largest resource needed partition (340). In one embodiment, this partition is identified based on the partition sorting shown at step (312). The selected partition is recursively split into two or more sub-partitions (342). In one embodiment, the number of sub-partitions is the quotient of the resources needed for the partition and the resource budget. Following step (342), the process returns to step (310) with the sub-partitions included in the sorting of partitions at step (312). Accordingly, in one embodiment, any one of the partitions may be sub-divided prior to processing for data reduction due to resource constraints.

Figure 4:
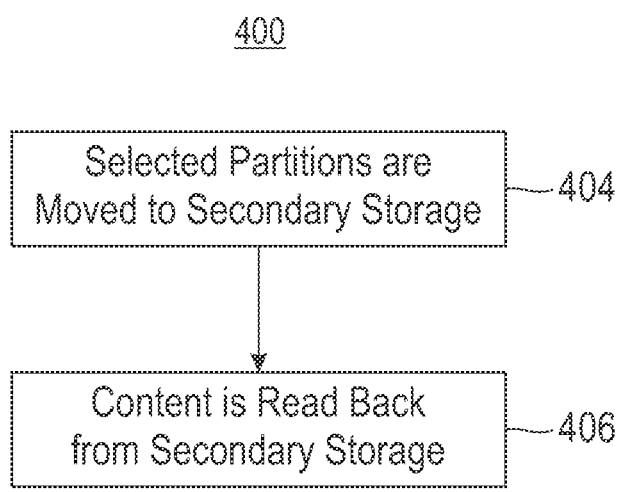
FIG. 4 depicts a flow chart illustrating a process for supporting spilling in the data reduction process.

To address resource constraints, content from any one of the partitions may be moved to secondary storage. This process is referred to as spilling. Referring to FIG. 4, a flow chart (400) is provided illustrating a process for supporting spilling in the data reduction process. As shown in FIG. 1, an assessment is conducted to ascertain if there are enough resources to support the partitions and further processing of the input record. With respect to spilling, the selected partitions are moved to secondary storage (404). During the data reduction processing shown in FIG. 3, when reduction processing requires data, the moved partitions content is read back from the secondary storage (406) so that the content is included in the data reduction. Moving a partition to secondary storage provides greater memory reduction than performing the aggregation operation on the partition. However, there is an expense associated with moving the content to secondary storage and then reading the content back. Accordingly, the aspect of spilling is limited and in one embodiment takes place if the resource constraint shown in FIG. 2 cannot be alleviated.

Figure 5:
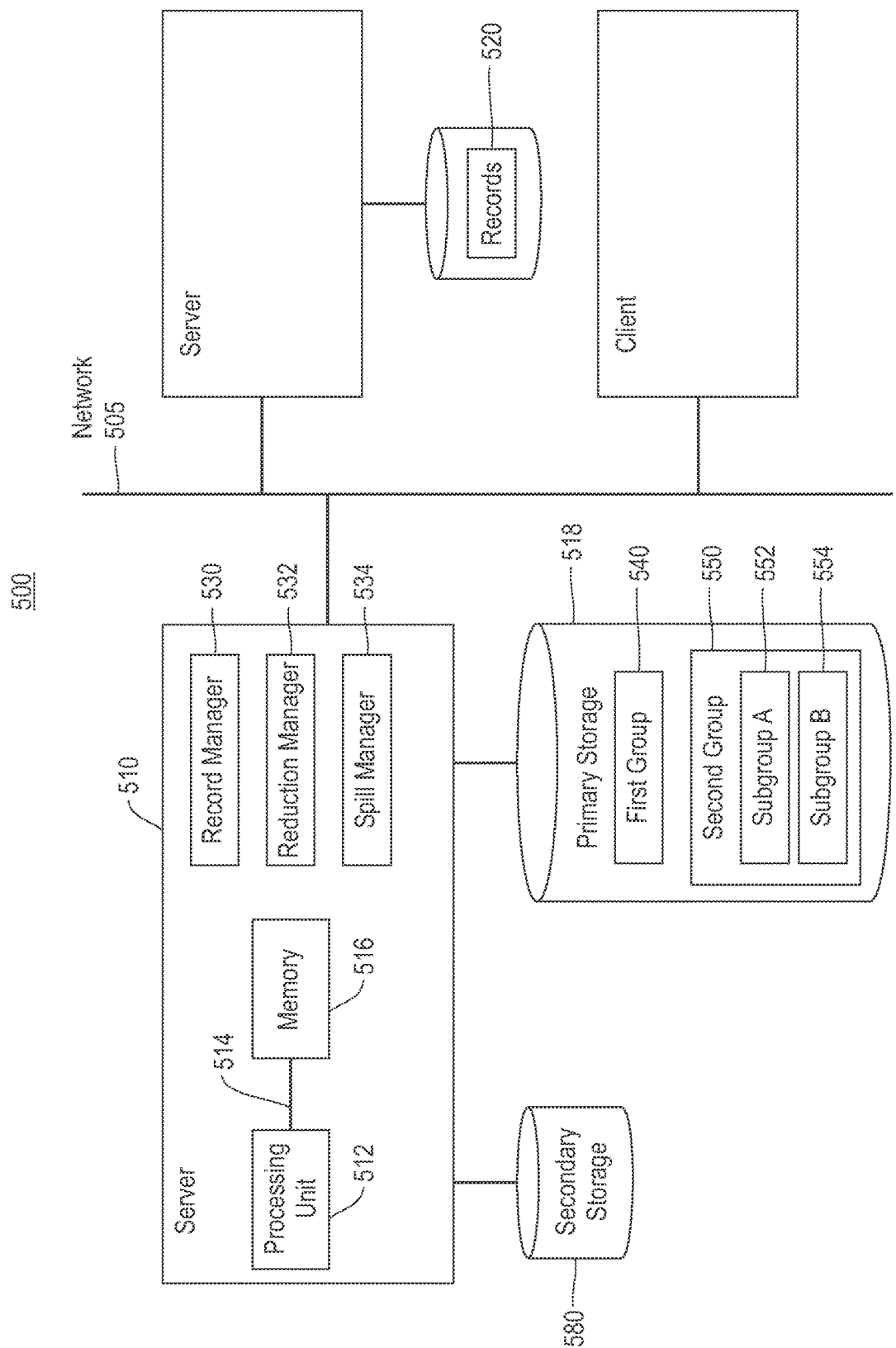
FIG. 5 depicts a block diagram illustrating a system with tools to support the data reduction.

The partitioned data reduction shown herein takes place in two phases, including a first phase with a local reduction to a defined subset or a global partition and a second phase of a data reduction operation based on a selection of the subset and/or one or more sub-partitions. Referring to FIG. 5, a block diagram (500) is provided illustrating a system with tools to support the data reduction. As shown, a server (510) is provided with a processing unit (512) in communication with memory (516) across a bus (514). The server (510) is provided with local data storage (518) also referred to as a primary storage device. In addition, the server (510) is in communication with other servers or client machines across a network connection (505). A set of records (520) are received by the server (510). In one embodiment, the records (520) are sent to the server (510) across the network connection (505). The received records are organized and processed. In one embodiment, the record organization includes forming an output record for each group of records that have a common characteristic.

As shown, tools are provided in communication with the processing unit (512) to process and organize the records. The tools include a record manager (530), a reduction manager (532), and a spill manager (534). The record manager (530) functions to organize output records from the received set of records (520). Specifically, the record manager (530) organizes the records into two or more groups. Two groups are shown herein, including a first group (540) and a second group (550). The first group (540) includes records having a common characteristic. In one embodiment, the first group (540) is referred to as a subset result. The second group (550) includes records that do not have a common characteristic. In one embodiment, the records placed in the second group (550) may be further separated into sub-groups. Similarly, although only two sub-groups are shown herein (540) and (550), in one embodiment, a third group may be provided to receive records that do not fit within the characteristic(s) of the records in the first group (540).

Resources in any system have limitations. As records are received and processed, the resources available to the records may reach capacity or near capacity, in which case the resources become constrained. The reduction manager (532) functions to create a reduced data set when the resources become constrained. As shown, the reduction manager (532) is in communication with the record manager (530), and the reduction manager (532) creates a reduced data set of records in the second group (550). In one embodiment, the reduction manager (532) may also create a reduced data set for records in the first group (540). The data reduction performed herein is also referred to as local reduction. Accordingly, the records are organized into groups, and the reduction manager (532) functions to create a reduced data set within each one of the groups.

At some point, the system may reach capacity. As the quantity of records received increases, the system may run low of memory to continue processing the records. To address capacity issues, the records placed in the second group (550) may be subject to reduction. The reduction manager (532) sub-divides the records in the second group (550) into two or more sub-groups (552) and (554). In one embodiment, the sub-groups (552) and (554) are based on a shared characteristic among the records. In addition, the reduction manager (532) assesses a resource budget for the data reduction. Specifically, the reduction manager (532) determines resource availability for processing the second group (550), and at the same time accounts for the resources previously designated for the first group (540) and other process states. In the case of two or more secondary groups, also referred to as the second group (550) and a third group, the reduction manager (532) assesses the resources availability for each of the second and third groups based on the projected resources required. As expressed herein, the second group (and the third group) may be further partitioned into sub-groups, and the reduction manager (532) may sort the sub-groups based on resources needed for each respective sub-group. The records in the groups, and in one embodiment, the sub-groups, are logically aggregated by the reduction manager (532) based on the projected resources required for processing. The reduction manager (532) assesses the logical aggregation based on the resource capacity, and may append one or more records into the aggregation. In one embodiment, the records selected for appending are selected from the sorting of the sub-groups. Accordingly, the reduction manager (532) functions to logically aggregate and select records for data reduction.

Once the logical aggregation is complete the reduction manager (532) performs a data reduction operation on the records in the aggregation. As articulated herein, records in the second group (550) may be further partitioned into sub-groups. In one embodiment, the record manager (530) estimates the number of distinct sub-groups (552) and (554) within the second group (550), and the reduction manager (532) separately assesses resources required for data reduction on the distinct sub-groups (552) and (554). In one embodiment, the reduction manager (532) is responsible for creation of sub-groups within the second group (550). The reduction manager (532) is responsible for assessing resource availability and capacity, and is also responsible for the logical aggregation of records. If the reduction manager (532) assesses that the logical aggregation exceeds the resources available, e.g. resource budget, the reduction manager (532) recursively separates any one of the distinguished group of records in the logical aggregation into two or more sub-groups. The quantity of sub-groups created in the separation process is based on resources needs for processing the sub-groups in view of the resource budget. Accordingly, the reduction manager (532) possesses the functionality of separating one or more of the aggregated groups.

Records are placed into groups by the record manager (530) and in one embodiment, the reduction manager (532). The groups formed by the record manager (530) are based upon common characteristics of the records, and the groups formed by the reduction manager (532) are primarily based upon resources for processing. In one embodiment, the records may be temporarily moved to accommodate resource availability, and more specifically, in response to a constraint of resources. As shown herein, a spill manager (534) is provided to move content of either a group or a sub-group to an alternate storage device (580), also referred to as a secondary storage device that has the resources available prior to receipt of the moved content, i.e. is not subject to a resource constraint. Once the data reduction operation is completed on the primary system, the reduction manager (532) communicates with the spill manager (534) and reads back the moved content to the primary storage (518) and performs data reduction on the groups of records that have been moved. Accordingly, the spill manager (534) functions to provide temporary storage of the records in view of resource constraints.

The processes supported by the managers (530)-(534) are shown herein for single thread processing. In one embodiment, the functionality of the managers (530)-(534) may be supported in a multi-threaded environment. More specifically, multiple threads are supported by the processing unit (512) and the managers (530)-(534) for parallel processing of the set of records. The reduction manager (532) divides up the available resource for supporting the data reduction among the threads. In one embodiment, the division of resources is evenly divided among the threads, and in another embodiment, additional resources may be allocated to one or more select threads, with the reduction manager (532) to identify the resource allocation to the separate threads in the logical aggregation of records. Accordingly, the multi-threaded processing functions along the same parameters as single threaded processing.

The server described above in FIG. 5 has been labeled with tools in the form of managers (530)-(534). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 6:
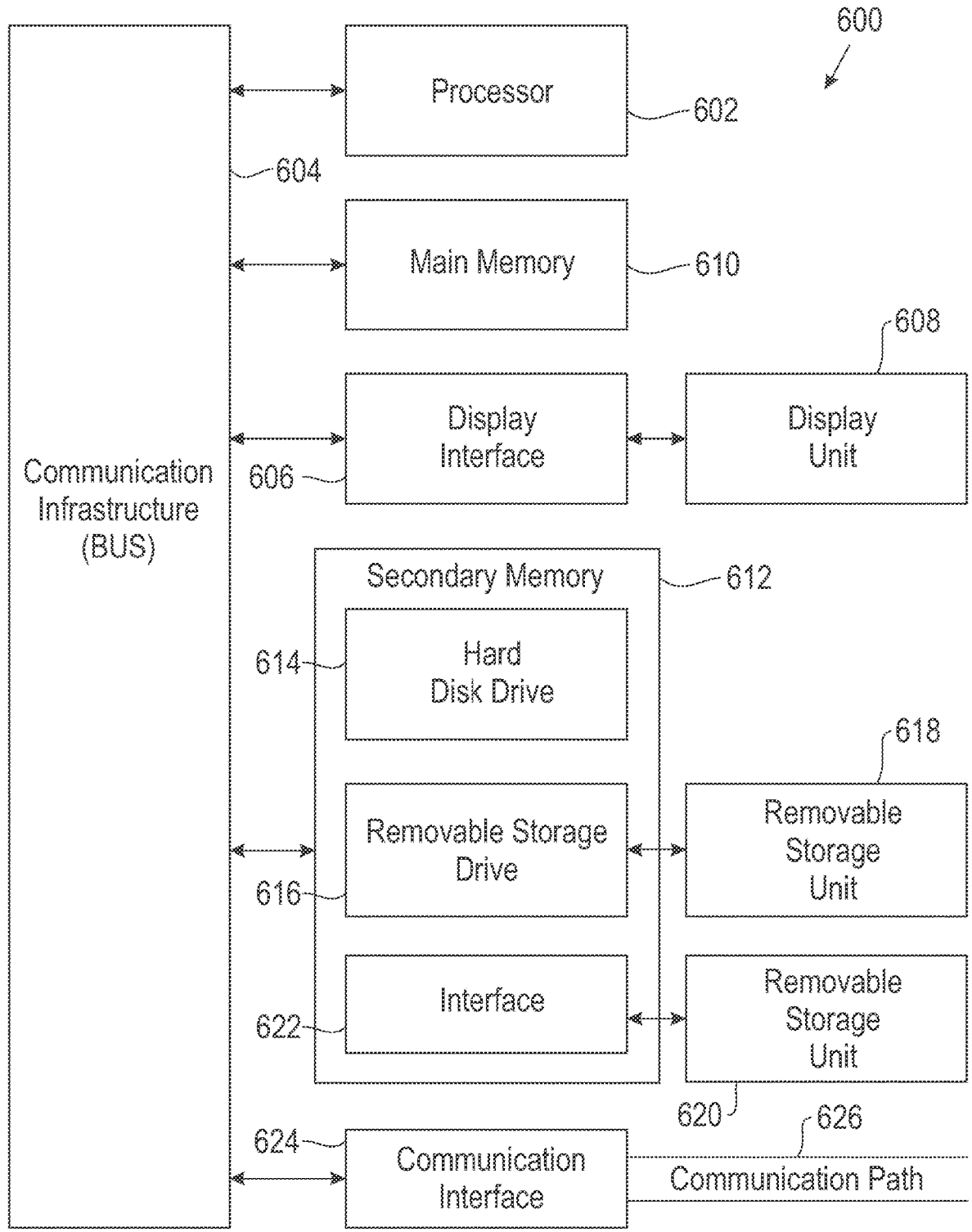
FIG. 6 depicts the block diagram of a system to implement an embodiment of the present invention.

Referring now to the block diagram of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616).

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) is in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operations of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions and/or acts or carry out combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of processing records, and specifically separation of the records into groups and data reduction of records based on the groups, creates a reduced data set for reducing resource consumption.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer implemented method for processing a set of computer data records, comprising:
    organizing the computer data records into two or more partitions, including a first partition having a first set of computer data records having a common characteristic and a second partition having a second set of computer data records excluded from the first partition;
    performing a data reduction operation in consideration of a computer resource constraint of a primary storage device, including:
        an intra-partition data reduction comprising logically aggregating one or more groups of computer data records within one or more of the partitions based on a commonality of characteristics, the data reduction subject to estimated computer resources for individually processing the groups, including selectively appending one or more excluded computer data records into the logical aggregation and selectively expanding a partition size responsive to the selective appending; and
        an inter-partition data reduction comprising evaluating a selection of partitions based on the computer resource constraint and selectively performing data reduction on the selected partitions, the inter-partition data reduction further comprising parallel processing the selected partitions with multiple threads in a single server system, including dividing up available resources evenly among the threads, and wherein the evaluation includes selectively moving content of one or more groups within the selected partitions to alternate storage operatively coupled to the primary storage device prior to performing the data reduction; and
    following completion of the data reduction operation of the primary storage device and available space in the primary storage device, reading back the moved content from the alternate storage and performing the data reduction on the moved content.

2. The method of claim 1, further comprising estimating a quantity of distinct sub-groups within the second partition and determining an amount of resources required to perform a data reduction operation for the second partition.

3. The method of claim 1, wherein the determined amount of resources to perform the data reduction operation is based on an estimated quantity of distinct sub-groups.

4. The method of claim 1, further comprising, in response to the logical aggregation of a single group exceeding the estimated resources, recursively splitting the single group into two or more sub-groups, with a quantity of sub-groups with a quantity of sub-groups created based on resources needed for the sub-groups and a resource budget.

5. A computer program product for processing a set of computer data records, the computer program product comprising a computer readable program storage device having program code embodied therewith, the program code executable by a processor to:
    organize the computer data records into two or more partitions including a first partition having a first set of records having common characteristic and a second partition having a second set of records excluded from the first partition;
    performs a data reduction operation in consideration of a computer resource constraint of a primary storage device, including:
        an intra-partition data reduction comprising logically aggregating one or more groups of computer data records within one or more of the partitions based on a commonality of characteristics, the data reduction subject to estimated computer resources for individually processing groups, including selectively appending one or more excluded computer data records into the logical aggregation and selectively expanding a partition size responsive to the selective appending; and an inter-partition data reduction comprising evaluating a selection of partitions based on the computer resource constraints and selectively performing data reduction on the selected partitions, the inter-partition data reduction further comprising parallel processing the selected partitions with multiple threads in a single server system, including dividing up available resources evenly among the threads, and wherein the evaluation includes selectively moving content of one or more groups within the selected partitions to alternate storage operatively coupled to the primary storage device prior to performing the data reduction; and following completion of the data reduction operation of the primary storage device and available space in the primary storage device, read back the moved content from the alternate storage and perform the data reduction on the moved content.

6. The computer program product of claim 5, further comprising program code to estimate a quantity of distinct sub-groups within the second partition and determine an amount of resources required to perform a data reduction operation for the second partition.

7. The computer program product of claim 5, wherein the determined amount of resources to perform the data reduction operation is based on the estimated quantity of distinct sub-groups.

8. The computer program product of claim 5, further comprising responsive to the logical aggregation of a single group exceeding the estimated resource, program code to recursively split the single group into two or more sub-groups, with a quantity of sub-groups created based on resources needed for the sub-groups and a resource budget.

9. A computer system comprising:
a processing unit in communication with memory, tools in communication with the processing unit to process a set of computer data records, the tools including:
a record manager to organize the computer data records into two or more partitions, including a first partition having a first set of computer data records having a common characteristic and a second partition having a second set of computer data records excluded from the first partition;
a reduction manager in communication with the record manager, the reduction manager to perform a data reduction operation in consideration of a computer resource constraint of a primary storage device, including;

an intra-partition data reduction comprising a logical aggregation of one or more groups of computer records within the one or more partitions based on a commonality of characteristics, the data reduction subject to estimated computer resources for individually processing the groups, including selectively appending one or more excluded computer data records into the logical aggregation and selectively expanding a partition size responsive to the selective appending; and an inter-partition data reduction comprising evaluation of a selection of partitions based on the computer resource constraints and selectively performing data reduction on the selected partitions, the inter-partition data reduction further comprising parallel processing the selected partitions with multiple threads in a single server system, including dividing up available resources evenly among the threads, and wherein the evaluation includes selective movement of content of one or more groups within the selected partitions to alternate storage prior to performing the data reduction; and following completion of the data reduction operation of the primary storage device and available space in the primary storage device, the reduction manager to read back the moved content from the alternate storage and perform the data reduction on the moved content.

10. The system of claim 9, further comprising the record manager to estimate a quantity of distinct sub-groups within the second partition and the reduction manager to determine an amount of resources required to perform a data reduction operation for the second partition.

11. The system of claim 9 further comprising the reduction manager to assess the resource budget, and responsive to the logical aggregation of a single group exceeding the estimated resources, the reduction manager to recursively split the single group into two or more sub-groups, with a quantity of sub-groups created based on resources needed for the sub-groups and a resource budget.

12. The system of claim 9, wherein additional resources may be allocated to one or more threads, with the reduction manager to identify resource allocation to the threads.

13. The system of claim 9, wherein multiple threads are assigned to a single selected partition.

14. The system of claim 13, wherein the multiple threads assigned to the single selected partition are running on a shared processing socket.

15. The method of claim 1, wherein the inter-partition data reduction evaluation includes a selection of the selectively expanded partitions based on the resource constraint, and further comprising selectively performing data reduction on the selection of the selectively expanded partitions.

* * * * *